(12) United States Patent
Tsuchiya et al.

(10) Patent No.: US 7,891,943 B2
(45) Date of Patent: Feb. 22, 2011

(54) STATOR CASCADE OF TURBO TYPE FLUID MACHINE

(75) Inventors: Naoki Tsuchiya, Tokyo (JP); Takeomi Ideta, Tokyo (JP)

(73) Assignee: Ishikawajima-Harima Heavy Industries, Co. Ltd., Tokyo (JP)

( * ) Notice: Subject to any disclaimer, the term of this patent is extended or adjusted under 35 U.S.C. 154(b) by 210 days.

(21) Appl. No.: 11/720,545

(22) PCT Filed: Nov. 24, 2006

(86) PCT No.: PCT/JP2006/323415
§ 371 (c)(1), (2), (4) Date: May 31, 2007

(87) PCT Pub. No.: WO2007/063768
PCT Pub. Date: Jun. 7, 2007

(65) Prior Publication Data
US 2009/0169371 A1  Jul. 2, 2009

(30) Foreign Application Priority Data
Nov. 29, 2005  (JP) .............................. 2005-343701

(51) Int. Cl.
*F01D 9/02* (2006.01)
(52) U.S. Cl. .................................. 415/195; 415/211.2
(58) Field of Classification Search ................ 415/195, 415/194, 191, 199.5, 211.2
See application file for complete search history.

(56) References Cited

U.S. PATENT DOCUMENTS

| | | | | |
|---|---|---|---|---|
| 3,006,603 | A * | 10/1961 | Caruso et al. ............... | 415/195 |
| 3,169,747 | A | 2/1965 | Seymour | |
| 4,068,471 | A * | 1/1978 | Simmons ..................... | 60/262 |
| 5,342,167 | A * | 8/1994 | Rosseau ...................... | 415/119 |
| 5,470,200 | A * | 11/1995 | Tupov et al. ................ | 415/195 |
| 6,439,838 | B1 * | 8/2002 | Crall et al. .................. | 415/119 |
| 6,789,998 | B2 * | 9/2004 | Chen et al. .................. | 415/1 |
| 6,905,303 | B2 * | 6/2005 | Liu et al. .................... | 415/142 |

FOREIGN PATENT DOCUMENTS

| | | |
|---|---|---|
| JP | 40-8949 | 5/1940 |
| JP | 55-025555 | 2/1980 |

(Continued)

OTHER PUBLICATIONS

International Search Report issued in corresponding application No. PCT/JP2006/323415, completed Jan. 1, 2007 and mailed Jan. 16, 2007.

(Continued)

*Primary Examiner*—Ninh H Nguyen
(74) *Attorney, Agent, or Firm*—Griffin & Szipl, P.C.

(57) ABSTRACT

In the invention, stator blades are arranged in such a manner that respective intervals between the adjacent stator blades (SV) become unequal at least partly. If the stator blades are arranged as mentioned above, there are formed wave fronts having different moving directions and phases, and these wave fronts are interfered with each other so as to be attenuated. Accordingly, an interference noise is reduced. Therefore, in accordance with the invention, it is possible to reduce an interference noise without enlarging a rotor stator blade interval as well as reducing a used amount of a sound absorption material.

14 Claims, 11 Drawing Sheets

FOREIGN PATENT DOCUMENTS

| | | |
|---|---|---|
| JP | 08-200283 | 8/1996 |
| JP | 2001-214705 | 8/2001 |
| JP | 2002-349498 | 12/2002 |
| JP | 2003-227302 | 8/2003 |
| JP | 2004-525303 | 8/2004 |
| JP | 2004-332562 | 11/2004 |

OTHER PUBLICATIONS

Sofrin, T.G. et al, Aircraft Turbomachinery Noise—Fan Noise, Pratt & Whitney Aircraft, Jul. 31-Aug. 10, 1973.

International Search Report issued in corresponding application No. PCT/JP2006/323415, completed Jan. 5, 2007 and mailed Jan. 16, 2007.

International Application No. PCT/JP2006/323415, which published as WO 2007/063768, Exhibit A.

Hans C. Ohanian, Physics, W.W. Norton & Company, Inc., pp. 391-392, Exhibit B.

Office Action issued in Japanese Patent Application No. 2007-522333, mailed Nov. 19, 2010.

* cited by examiner

SOUND SOURCE DISTRIBUTION

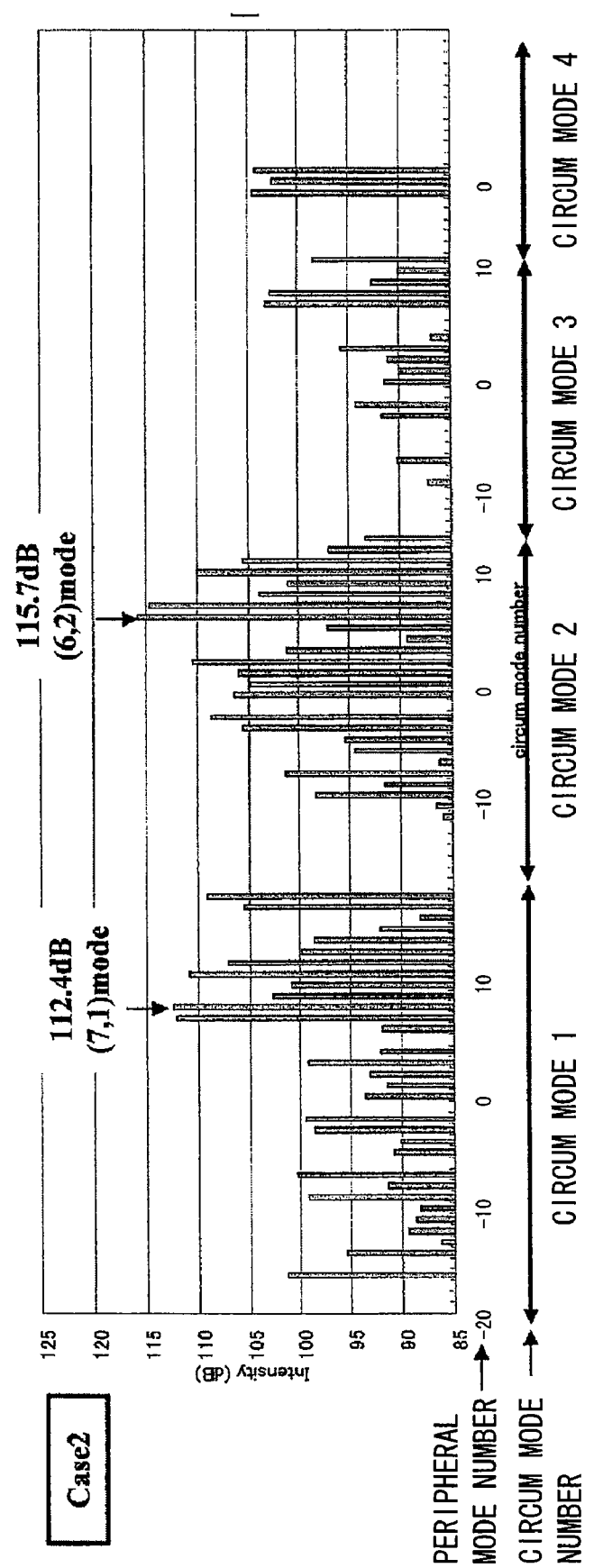

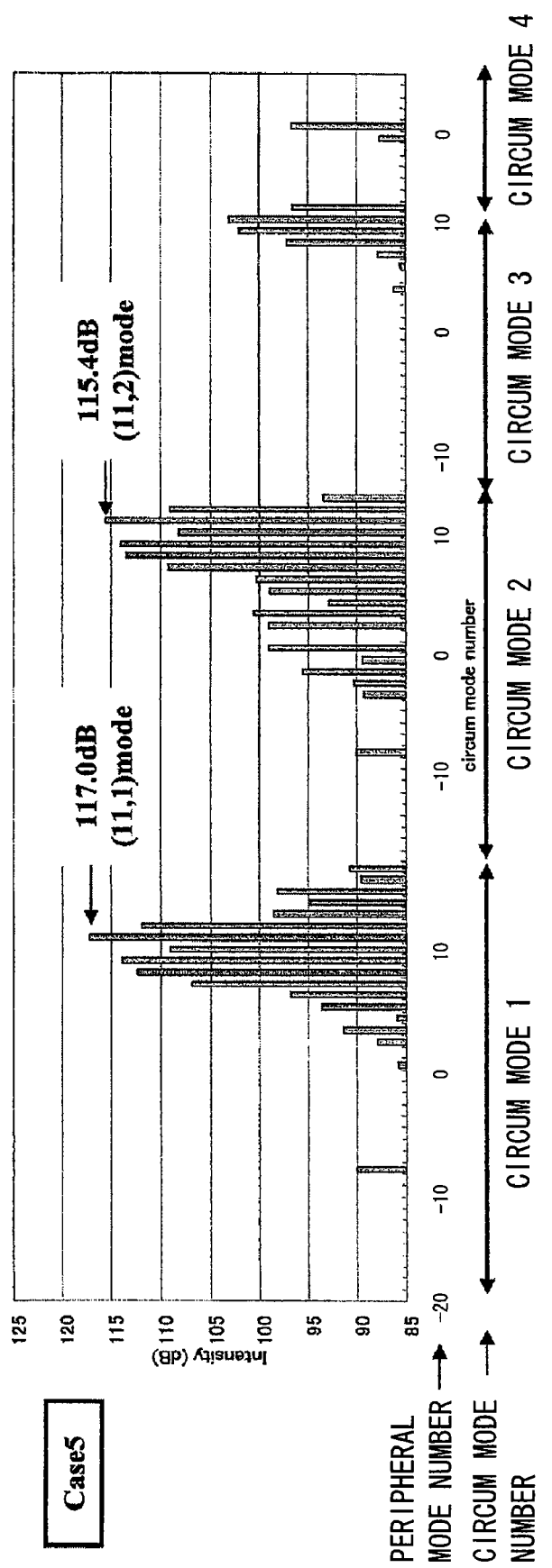

STATOR CASCADE OF TURBO TYPE FLUID MACHINE

This is a National Phase Application in the United States of International Patent Application No. PCT/JP2006/323415 filed Nov. 24, 2006, which claims priority on Japanese Patent Application No. 2005-343701, filed Nov. 29, 2005. The entire disclosures of the above patent applications are hereby incorporated by reference.

BACKGROUND OF THE INVENTION

1. Technical Field of the Invention

The present invention relates to a stator cascade of a turbo type fluid machine such as a fan, a compressor, a turbine or the like.

2. Description of the Related Art

FIG. 1 is a view schematically showing a layout state of conventional rotor cascade 2 and stator cascade 4, for example, in a turbo type fluid machine such as a fan, a compressor, a turbine or the like of a jet engine.

In this drawing, a vertical direction corresponds to an axial direction and a horizontal direction corresponds to a peripheral direction. As shown in this drawing, the rotor cascade 2 is constituted by a plurality of rotor blades RB1 to RB5 which are arranged at an equal interval in a peripheral direction, whirls in a direction shown by an arrow in the drawing, and feeds a fluid such as an air or the like to a downstream side. The stator cascade 4 is arranged in a downstream side of the rotor cascade 2, is constituted by a plurality of stator blades SV1 to SV7 which are arranged at an equal interval in a peripheral direction, and commutates the fluid from the rotor cascade 2 so as to circulate further downstream.

In this case, if the rotor cascade 2 mentioned above is swirled, a following wake (also called as a wake, hereinafter, refer to as "wake") having different speed components in an axial direction is generated in a rear end portion of each of the rotor blades RB1 to RB5 in a trailing manner. Further, since the wake is moved in the peripheral direction together with the rotor blade, a periodical interference is repeated between the wake and each of the stator blades SV1 to SV7, and a great pressure fluctuation is generated on a surface of the stator blade due to the interference. The pressure fluctuation is a fluctuation having a frequency (hereinafter, refer to as "rotor blade passing frequency") obtained by multiplying a number of the rotor blades constituting the rotor cascade 2 by a rotational speed (rpm), and a noise having the rotor blade passing frequency mentioned above is generated by the pressure fluctuation. The noise generated as mentioned above is called as "interference noise".

In a jet engine, since a jet noise is widely reduced on the basis of an appearance of a high bypass ratio turbofan engine, a main body of the engine noise is changed from the jet noise to a fan noise, and a main sound source of the fan noise is constituted by the interference noise mentioned above. Accordingly, in the light of an environmental suitability, it comes to an important problem to reduce the interference noise generated in the fan, particularly in the turbofan engine.

As one of prior arts for reducing the interference noise, there has been known a method of selecting a ratio of number between the rotor blades and the stator blades optimum. This is a method of selecting the rotor stator blade number ratio in such a manner that a specific component in frequency components (constituted by a primary component, a secondary component, a tertiary component, . . . an nth component) of the propagated noise attenuates exponentially. The attenuation of the specific component is called as "cutoff", and a condition at that time is called as "cutoff condition".

In the interference noise, since a sound level of the primary component is highest in the frequency component of the interference noise generated by the rotor blade passing frequency mentioned above, the rotor stator blade number ratio is generally selected in such a manner as to cut off the primary component. The interference noise is reduced by attenuating the primary component of the interference noise in the manner mentioned above.

In this case, with regard to the reduction of the interference noise, various proposals have been made in the following patent documents 1, 2 and the like.

Further, a generating mechanism of the interference noise in the fan of the jet engine is described in the following non-patent document 1.

Patent Document 1: Japanese Unexamined Patent Publication No. 2002-349498

Patent Document 2: Japanese Unexamined Patent Publication No. 2003-227302

Non-Patent Document 1: T. G. Sofrin, "Aircraft Turbomachinery Noise Fan Noise", Pratt & Whitney Aircraft Jul. 31-Aug. 10, 1973

In accordance with the optimum selection of the rotor stator blade number ratio mentioned above, it is possible to obtain a certain level of noise reduction effect. However, this method only cuts off the primary component of the noise, and can not cut off the higher order component equal to or more than the secondary component. Accordingly, in order to suppress a strength of the interference noise generated by the higher order component equal to or more than the secondary component, it is necessary to employ a countermeasure of attaching a sound absorption plate or enlarging an interval in an axial direction between the rotor blade and the stator blade.

However, the following problems are generated in these countermeasures.

In accordance with the attachment of the sound absorption plate, the temporarily generated noise is absorbed by the sound absorption plate. However, for example, in the case of the jet engine, since the sound absorbing plate is required at about 70 kg for reducing the noise at 3 dB from an actual condition, there is generated a problem that an increase of a cost and an engine weight is caused.

In accordance with the enlargement of the rotor stator blade interval, it is possible to promote the attenuation of the wake accompanying in the rotor blade rear end portion, and it is possible to weaken a non-steady aerodynamic force on the stator blade surface forming the noise source. However, for example, in the case of the fan of the jet engine, if the interval in an engine axial direction between the fan rotor blade and the fan stator blade is enlarged, the length in the engine axial direction is elongated, so that there is generated a problem that an increase of the engine weight is caused.

SUMMARY OF THE INVENTION

The present invention is made by taking the matters mentioned above into consideration, and an object of the present invention is to provide a stator cascade of a turbo type fluid machine which can reduce an interference noise without enlarging a rotor stator blade interval as well as reducing a used amount of a sound absorption material.

In order to achieve the object mentioned above, in accordance with the present invention, there is provided a stator cascade of a turbo type fluid machine, the stator cascade being arranged in a downstream side of a rotor cascade in the turbo type fluid machine and constituted by a plurality of stator blades which are arranged at intervals in a peripheral direction, wherein a plurality of stator blades are arranged in such a manner that the respective intervals between the adjacent stator blades become unequal at least partly.

In the case that the stator blades are arranged at the equal interval as in the prior art, the wakes at the equal interval are interfered with the stator blades at the fixed cycle, there is generated a relation that a distance between a wave surface of a circular wave caused by the pressure fluctuation generated in each of the stator blades on the basis of the interference, and a wave source has a fixed ratio in a peripheral direction.

In this case, if a segment between contact points at a time of drawing tangent lines to the circular waves from the adjacent wave sources is defined as "wave front", there is generated a state in which the wave fronts in the case that the stator blades are arranged at the equal interval are arranged in alignment.

In the aligned wave fronts, since phases of sonic waves from the respective wave sources are identical, the sonic waves are not interfered with each other (that is, do not attenuate amplitudes), but are propagated in a direction orthogonal to themselves. This is a mechanism by which the interference noise is generated. In this case, a more detailed description of a principle of the interference noise will be later described in detail.

On the other hand, in the present invention, since the stator blades are arranged in such a manner that the respective intervals between the adjacent stator blades become unequal at least partly, there is formed the portion in which the distance between the wave surface of the circular wave generated from the stator blades on the basis of the interference with the wake and the wave source does not satisfy the relation having the fixed ratio in a peripheral direction. Accordingly, since the wave front having the different moving direction and phase from those of the other portions is formed at least partly, they are interfered with each other so as to be attenuated.

Further, the attenuation by the mutual interference of the wave front mentioned above is applied not only to the primary component of the generated sound wave but also the secondary or higher order component in the same manner. Accordingly, even in the case of selecting such the conventional rotor stator blade number ratio as to cut off only the primary component, it is possible to reduce the noise generated by the secondary or higher order component.

Further, even in the case of selecting the rotor stator blade number ratio by which the primary component of the generated sound wave is not originally cut off, the interference noise is reduced by the attenuation caused by the mutual interference of the wave front mentioned above.

As mentioned above, since the interference noise is reduced, it is possible to reduce the used amount of the sound absorption plate. Further, it is possible to reduce the interference noise without enlarging the interval between the rotor and stator blades.

Further, in accordance with this structure, it is possible to prevent the weight from being increased as well as it is possible to reduce the cost.

Further, in accordance with the present invention, there is provided a stator cascade arranged in a downstream side of a rotor cascade in a turbo type fluid machine, and constituted by a plurality of stator blades arranged at intervals in a peripheral direction, wherein a plurality of stator blades are arranged in such a manner that respective intervals between the adjacent stator blades are all unequal.

As mentioned above, if the stator blades are arranged in such a manner that the intervals between the adjacent stator blades are all unequal, the respective wave fronts formed by the sound waves generated from the adjacent stator blades are all different in a moving direction and a phase thereof.

Accordingly, it is possible to make the effect of interfering with each other so as to attenuate high, and it is possible to effectively reduce the interference noise.

Further, in the stator cascade of the turbo type fluid machine in accordance with the present invention mentioned above, the respective intervals between the adjacent stator blades are repeatedly increased and decreased irregularly per the interval.

As mentioned above, if the stator blades are arranged in such a manner that the respective intervals between the adjacent stator blades are repeatedly increased and decreased irregularly per the interval, a degree of disorder is increased in the moving direction and the phase of the respective wave fronts formed by the sound waves generated from the adjacent stator blades.

Accordingly, it is possible to make the effect of being interfered with each other so as to attenuate higher, and it is possible to make the effect of reducing the interference noise higher.

Further, at least a part of intervals of the intervals between the adjacent stator blades is increased at least 5% or more or decreased at least 5% or more with respect to the interval between the stator blades in the case that all the stator blades are arranged at an equal interval.

Further, at least a part of intervals of the intervals between the adjacent stator blades is increased at least 10% or more or decreased at least 10% or more with respect to the interval between the stator blades in the case that all the stator blades are arranged at an equal interval.

Further, at least a part of intervals of the intervals between the adjacent stator blades is increased at least 20% or more or decreased at least 20% or more with respect to the interval between the stator blades in the case that all the stator blades are arranged at an equal interval.

Further, a value obtained by dividing a standard deviation of a dispersion in the peripheral direction of the intervals between the adjacent stator blades by an average stator blade interval is equal to or more than 0.03.

Further, a value obtained by dividing a standard deviation of a dispersion in the peripheral direction of the intervals between the adjacent stator blades by an average stator blade interval is equal to or more than 0.1.

Further, a value obtained by dividing a standard deviation of a dispersion in the peripheral direction of the interval differences between the adjacent stator blades by an average stator blade interval is equal to or more than 0.03.

Further, a value obtained by dividing a standard deviation of a dispersion in the peripheral direction of the interval differences between the adjacent stator blades by an average stator blade interval is equal to or more than 0.1.

It is possible to obtain the effect that the wave fronts are interfered with each other so as to be attenuated, by setting the layout of the stator blades in such a manner as to satisfy the condition mentioned above, and it is possible to obtain an effect of reducing the interference noise.

Further, in the stator cascade of the turbo type fluid machine in accordance with the present invention, the turbo type fluid machine is constituted by a fan of a jet engine, and the stator blade is constituted by a stator blade of the fan.

As mentioned above, it is possible to largely contribute to the reduction of the fan noise corresponding to the main body of the engine noise, by applying the stator cascade in accordance with the present invention to the jet engine.

BRIEF DESCRIPTION OF THE DRAWINGS

FIGS. 10B to 10E show a result of analysis of the embodiment in accordance with the present invention.

DESCRIPTION OF THE PREFERRED EMBODIMENT

Figure 1:
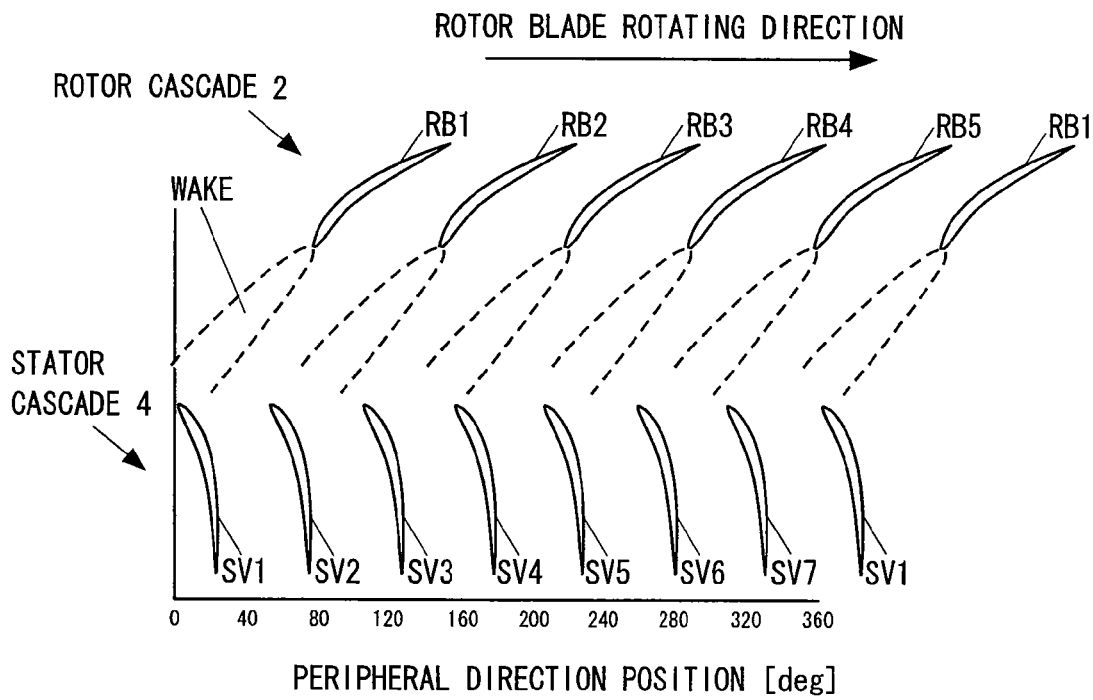
FIG. 1 is a view schematically showing a layout state of conventional rotor cascade and stator cascade in a turbo type fluid machine.
Figure 2:
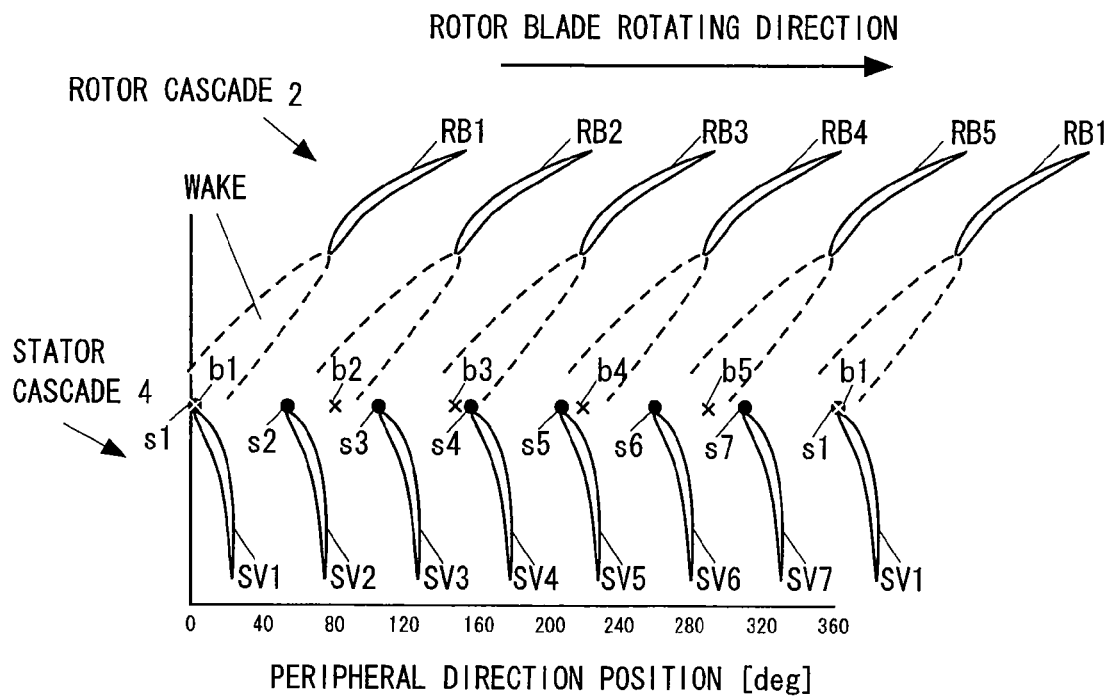
FIG. 2 is a view showing a positional relation between rotor blades and stator blades at a certain instant.
Figure 3:
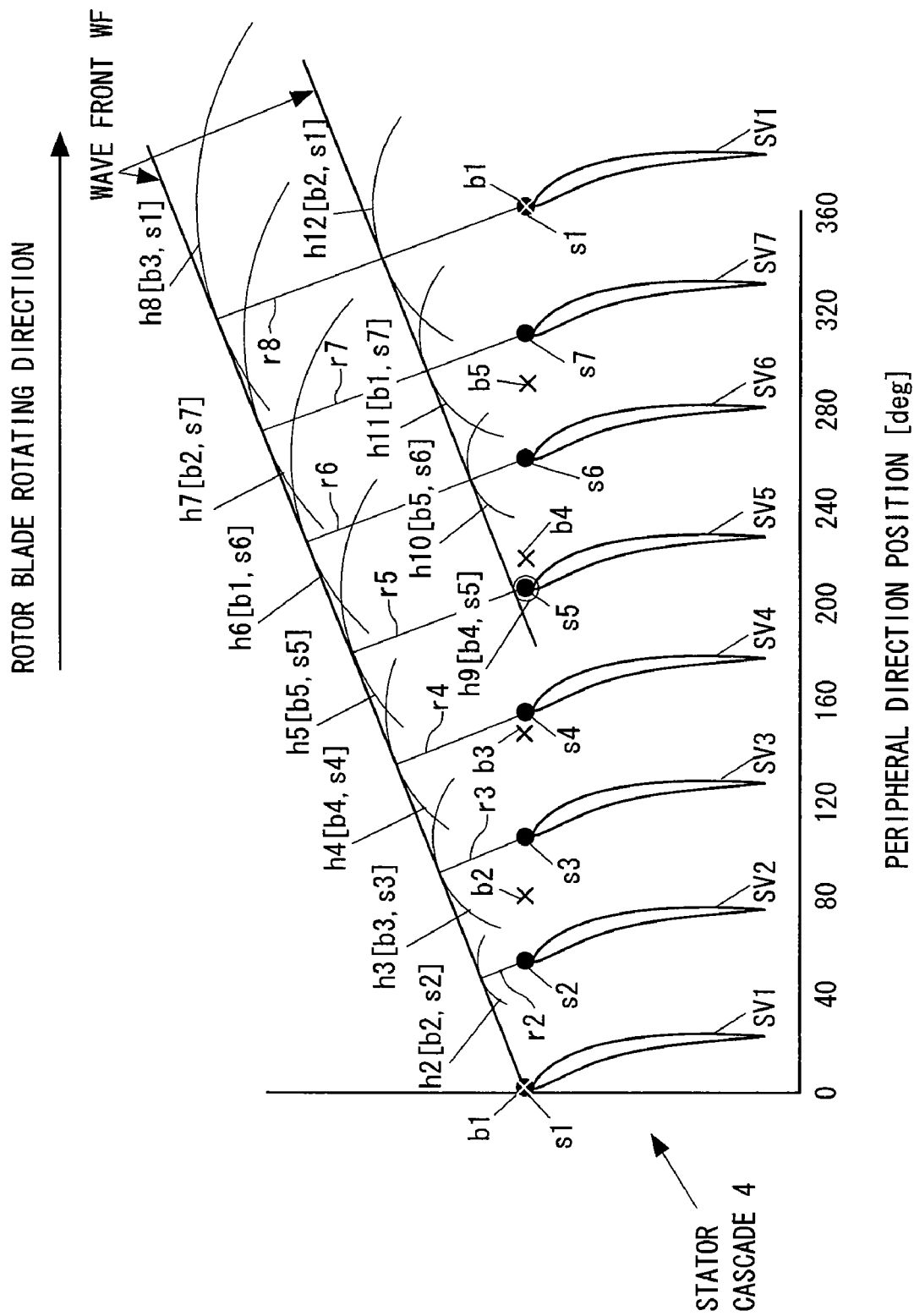
FIG. 3 is a view showing a positional relation among the stator blades, a wake and a sound wave generated from the stator blades at the same instant as FIG. 2.

Before describing a specific embodiment in accordance with the present invention, a description will be first given of a mechanism by which an interference noise is generated, with reference to FIGS. 2 and 3, in order to easily understand the present invention.

FIG. 2 is a view showing a positional relation between rotor blades and stator blades at a certain instance. In FIG. 2, a vertical direction corresponds to an axial direction, and a horizontal direction corresponds to a peripheral direction. A rotor cascade 2 shown in this drawing is constituted by a plurality of (five in this embodiment) rotor blades RB1 to RB5 arranged at an equal interval in a peripheral direction, and is swirled in a direction shown by an arrow in the drawing, and a wake is swirled in an accompanying manner in a rear end portion of each of the rotor blades.

Further, a stator cascade 4 arranged in a downstream side of the rotor cascade 2 is constituted by a plurality of (seven in this embodiment) stator blades SV1 to SV7 arranged at an equal interval in a peripheral direction. The stator cascade 4 is the same as the stator cascade described in the prior art.

Since the wake mentioned above is moved in the peripheral direction together with the rotor blades RB1 to RB5, a periodical interference is repeated between the wake and the respective stator blades SV1 to SV7. a great pressure fluctuation is generated on a stator blade surface on the basis of the interference, and a sound wave is generated at this position. Positions s1 to s7 of sound sources of the sound waves from the respective stator blades SV1 to SV7 are indicated by black circle marks.

Further, positions b1 to b5 in the peripheral direction of the wakes corresponding to the respective rotor blades RB1 to RB5 are indicated by marks of crosses. In this case, there is a case that b1 to b5 are described as the wakes themselves for convenience of explanation.

FIG. 3 is a view showing a positional relation among the stator blade, the wake and the sound wave generated from the stator blade at the same instance as FIG. 2. In this drawing, an illustration of the rotor cascade is omitted, however, the layout condition of the rotor cascade and the stator cascade is the same as FIG. 2.

In this drawing, there is shown an instance that the wake b1 is interfered with the stator blade SV1 in the wave source s1 so as to generate the sound wave.

At this instance, a circular wave h2 around s2 is already generated, and makes progress to an illustrated position. The circular wave h2 corresponds to a sound wave generated by the wake b2 interfered with the stator blade SV2 at the position s2 before a short time.

In this case, in order to easily understand a corresponding relation between the wave source of the sound wave and the wake corresponding to a reason that the sound wave is generated, the relation is indicated by symbols between parentheses such as [m, n]. In this case, m=b1 to b5, and n=s1 to s7.

Further, at this instance, a circular wave h3 around the wave source s3 is already generated, and makes progress to an illustrated position. The circular wave h3 corresponds to a sound wave generated by the wake b3 interfered with the stator blade SV3 at the wave source s3 before a short time before the circular wave h2 is generated.

Further, at this instance, a circular wave h4 around s4 is already generated, and makes progress to an illustrated position. The circular wave h4 corresponds to a sound wave generated by the wake b4 interfered with the stator blade SV4 at the wave source s4 before a short time before the circular wave h3 is generated.

With regard to the circular waves h5 to h12, respective corresponding relations are indicated by symbols between parentheses showing the wave source positions (s5 to s7) and the wake positions (b1 to b5).

Further, distances between the wave sources and the wave surfaces of the circular waves h2 to h8 (that is, radii of the circular waves) are indicated by r2 to r8.

In this case, a segment between contact points at a time of drawing tangential lines in the circular waves from the adjacent wave sources is defined as "wave front".

Accordingly, in the case that the stator blades are arranged at the equal interval, the wakes arranged at the uniform interval are interfered with the stator blades at a fixed cycle. Therefore, the distances r2 to r8 are in a relation having a fixed ration in the peripheral direction, whereby the wave front mentioned above formed by the adjacent circular waves in the circular waves h2 to h8 form a state in which the wave fronts are arranged in alignment.

In the wave fronts arranged in alignment, since the phases of the sound waves from the respective wave sources s1 to s7 are identical, the wave fronts are not interfered with each other (that is, the amplitudes are not attenuated), but are propagated in a direction orthogonal to themselves. This is a mechanism by which the interference noise is generated.

Taking the points mentioned above into consideration, a description will be in detail given below of a preferable embodiment in accordance with the present invention with reference to the accompanying drawings. In this case, the same reference numerals are attached to common portions in the drawings, and an overlapping description will be omitted.

Figure 4:
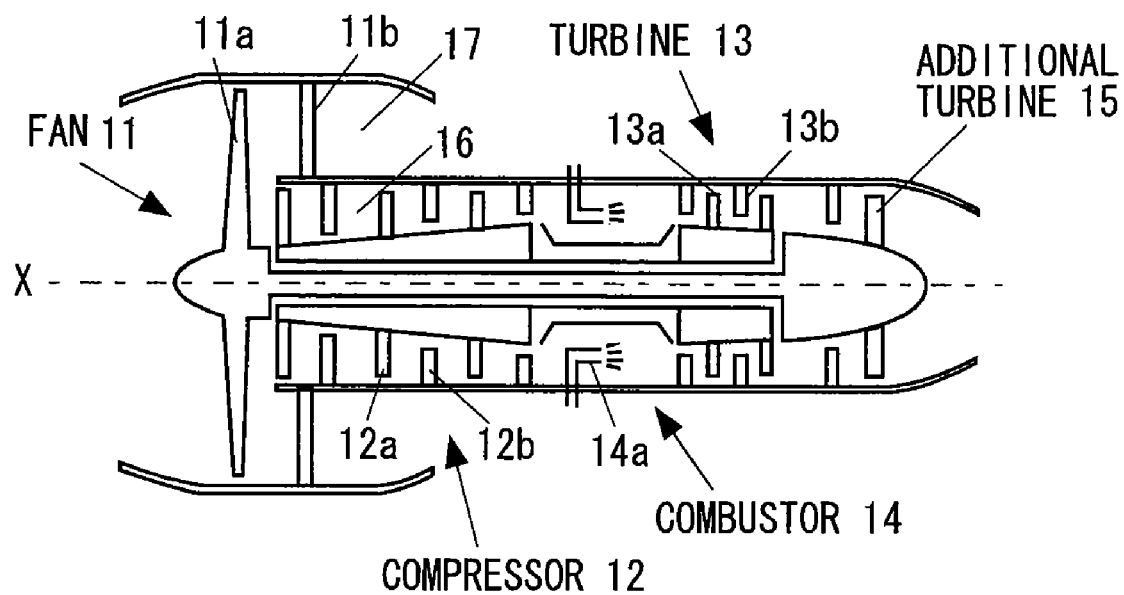
FIG. 4 is a schematic view showing one example of a jet engine to which the stator cascade of the turbo type fluid machine in accordance with the present invention can be applied.

FIG. 4 is a schematic view showing an example of a jet engine to which the stator cascade of the turbo type fluid machine in accordance with the present invention can be applied. First, a description will be given of a basic structure of the jet engine.

This jet engine is provided with a fan 11, a compressor 12 and a turbine 13 which serve as the turbo type fluid machine, and a combustor 14.

The fan 11 is provided with a fan rotor cascade 11a and a fan stator cascade 11b.

The fan rotor cascade 11a is provided in an engine main body rotatably around an axis x, is constituted by a plurality of fan rotor blades which are arranged at equal intervals in a peripheral direction, and is structured such as to feed an air to an annular main flow path 16 and an annular bypass flow path 17 which are formed coaxially in an inner portion of the engine main body.

The fan stator cascade 11b is arranged in a downstream side of the fan rotor cascade 11a, is constituted by a plurality of fan stator blades which are arranged at intervals in a peripheral direction, and is structured such as to commutate the air fed into the bypass flow path 17 in a non-swirling flow.

The compressor 12 is provided in a rear side of the fan 11, is structured such as to compress the air taken within the main flow path 16, and is provided with a compressor rotor cascade 12a provided rotatably around the axis x and over a plurality of stages in an axial direction, and a compressor stator cascade 12b arranged alternately with the compressor rotor cascade 12b over a plurality of stages in the axial direction.

The compressor 14 is provided in a downstream side of the compressor 12, and is structured such as to inject a fuel into the compressed air by an injection nozzle 14a provided in an inner portion and burn the fuel together with the air.

The turbine 13 is provided in a downstream side of the combustor 14, is structured such as to be driven by a combustion gas from the combustor 14, and is provided with a turbine rotor cascade 13a provided rotatably around the axis x and over a plurality of stages in the axial direction, and a turbine stator cascade 13b arranged alternately with the turbine rotor cascade 13a over a plurality of stages in the axial direction. Rotating shafts of the turbine 13 and the compressor 12 are integrally coupled, and the compressor 12 is driven by driving the turbine 13.

Further, an additional turbine 15 integrally coupled to the rotating shaft of the fan 11 is provided in a downstream side of the turbine 13, and the fan 11 is driven by driving the additional turbine 15.

As mentioned above, the jet engine is provided with the fan 11, the compressor 12 and the turbine 13 as the turbo type fluid machine provided with the stator cascade, the stator cascade of the turbo type fluid machine in accordance with the present invention can be applied to any of them.

Further, the mode of the jet engine mentioned above corresponds to one example, and the stator cascade in accordance with the present invention can be applied to the other mode of jet engines and the other gas turbine engines.

A description will be given below without particularly limiting to the rotor cascade and the stator cascade of any one of the fan, the compressor and the turbine.

Figure 5:
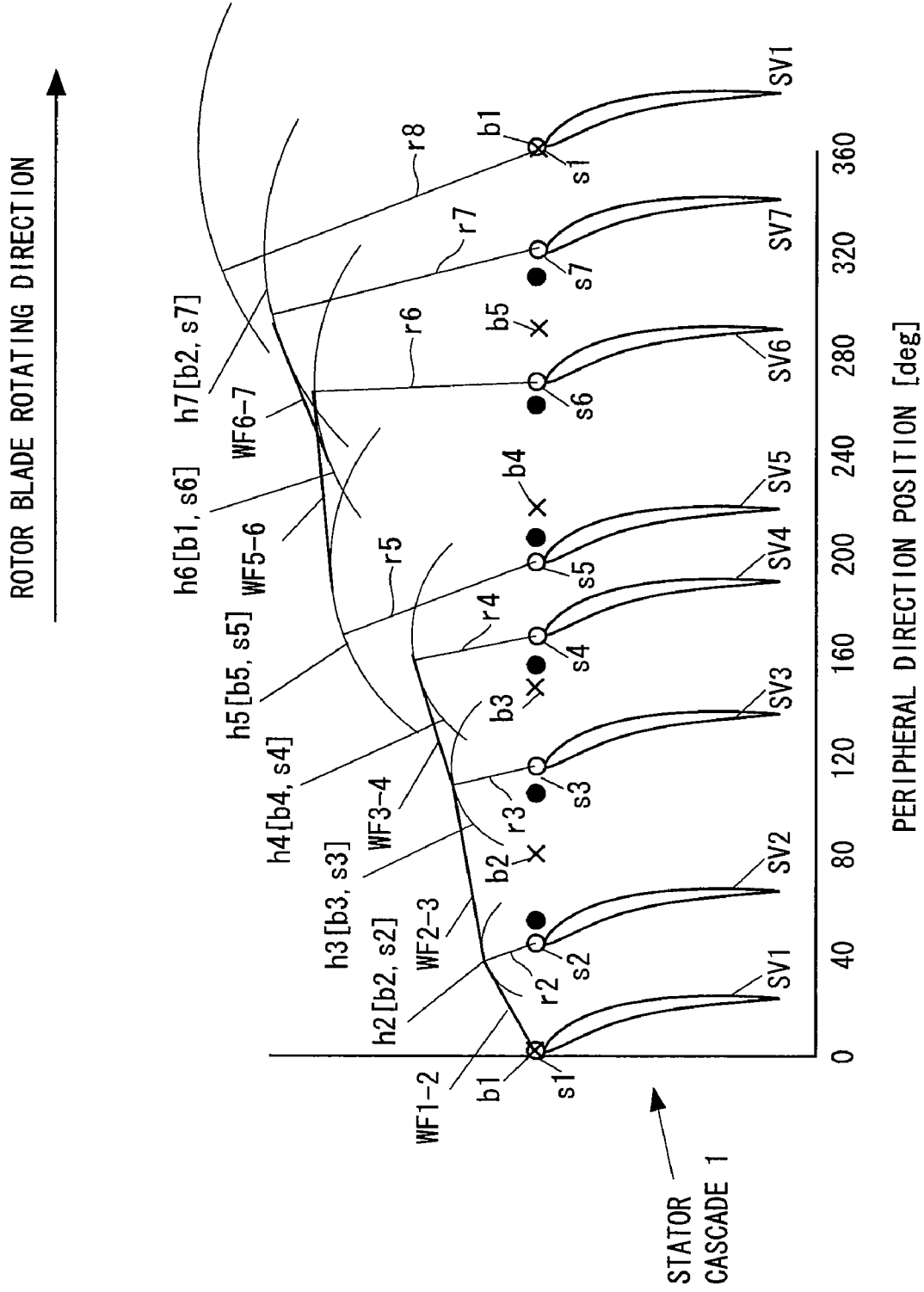
FIG. 5 is a view showing a stator cascade of a turbo type fluid machine in accordance with an embodiment of the present invention.

FIG. 5 is a view showing a stator cascade 1 of a turbo type fluid machine in accordance with an embodiment of the present invention. Further, FIG. 5 shows a positional relation among a stator blade, a wake and a sound wave generated from the stator blade at a certain instance.

In FIG. 5, a vertical direction corresponds to an axial direction and a horizontal direction corresponds to a peripheral direction. Although not being shown in the drawing, there is arranged a rotor cascade constituted by a plurality of (five in this embodiment) rotor blades arranged in an equal interval in a peripheral direction, the rotor cascade is swirled in a direction shown by an arrow in the drawing, and wakes are lined up at an equal interval in the peripheral direction at rear end portions of the respective rotor blades mentioned above, and move in the peripheral direction accompanying with the respective rotor blades. Positions of the wakes in the peripheral position are shown by marks of crosses attached to symbols b1 to b5. In this case, for convenience of explanation, there is a case that a description will be given on the assumption that the symbols b1 to b5 are as the wakes themselves.

Further, a stator cascade 1 constituted by a plurality of (seven in this embodiment) stator blades SV1 to SV7 arranged at intervals in the peripheral direction is arranged in a downstream side of the rotor cascade (not shown) mentioned above.

Since the wakes b1 to b5 are moved in the peripheral direction together with the rotor blades, a periodical interference is repeated between the wakes and respective rotor blades, a great pressure fluctuation is generated on a surface of the stator blade on the basis of the interference, and a sound wave is generated at the position. Positions of wave sources of the sound waves from the respective stator blades SV1 to SV7 are shown by white circle marks attached to symbols s1 to s7. In this case, the positions of the wave sources are positions corresponding to upstream side leading end portions of the respective stator blades SV1 to SV7.

Further, black circle marks in this drawing indicate positions of the wave sources in the case that the respective stator blades are arranged at equal intervals. In other words, the black circle marks indicate the conventional wave source positions shown in FIG. 3.

As shown in this drawing, in the stator cascade 1 in accordance with the present invention, a position in the peripheral direction of each of the stator blades SV1 to SV7 is arranged at a position which is deviated from the case that the respective stator blades are arranged at the equal interval. In other words, the stator blades are arranged in such a manner that the intervals in the peripheral direction of the respective stator blades SV1 to SV7 are unequal.

In the case of observing a state of the sound wave generated from each of the stator blades SV1 to SV7 arranged as mentioned above at a certain instant, the state becomes as follows.

At the certain instant mentioned above, the wake b1 is interfered with the stator blade SV1 in the wave source s1, and generates the sound wave.

Further, at the instant mentioned above, a circular wave h2 around s2 is already generated, and makes progress to an illustrated position. The circular wave h2 is a sound wave generated by the wake b2 interfered with the stator blade SV2 at the position s2 before a short time before the instant mentioned above.

In this case, in FIG. 5, in the same manner as FIG. 3, in order to easily understand the corresponding relation between the wave source of the sound wave and the wake corresponding to the reason that the sound wave is generated, the relation is indicated by symbols between parentheses such as [m, n]. In this case, m=b1 to b5, and n=s1 to s7.

Further, at the instance mentioned above, a circular wave h3 around the wave source s3 is already generated, and makes progress to an illustrated position. The circular wave h3 corresponds to a sound wave generated by the wake b3 interfered with the stator blade SV3 at the wave source s3 before a short time before the circular wave h2 is generated.

Further, at the instance mentioned above, a circular wave h4 around the wave source s4 is already generated, and makes progress to an illustrated position. The circular wave h4 corresponds to a sound wave generated by the wake b4 interfered with the stator blade SV4 at the wave source s4 before a short time before the circular wave h3 is generated.

In the same manner, with regard to the circular waves h5 to h7, respective corresponding relations are indicated by symbols between parentheses showing the wave source positions (s5 to s7) and the wake positions (b1 to b5).

Further, distances between the wave sources and the wave surfaces of the circular waves h2 to h8 (that is, radii of the circular waves) are indicated by r2 to r8.

In this case, in the same manner as FIG. 3, a segment between contact points at a time of drawing tangential lines in the circular waves from the adjacent wave sources is defined as "wave front". Accordingly, as shown in FIG. 5, it is possible to draw wave fronts WF1-2, WF2-3, WF3-4, WF5-6 and WF6-7.

As explained in FIG. 3, in the case that the stator blades are arranged at the equal interval, the wakes arranged at the uniform interval are interfered with the stator blades arranged at the equal interval at a fixed cycle. Therefore, the distance between the wave surface of the sound wave generated from the stator blade on the basis of the interference with the wake, and the wave source has a relation having a fixed ratio in the peripheral direction, and the respective wave fronts are formed in a state of being arranged in alignment.

On the contrary, in the stator cascade 1 in accordance with the present invention, the respective wave fronts are not formed in a state of being arranged in alignment. This is because the stator blades are arranged in such a manner that the intervals in the peripheral direction of the respective stator blades become unequal, whereby the distances r1 to r8 between the wave surfaces of the sound waves generated from the stator blades on the basis of the interference with the wakes, and the sound sources do not have the relation with the fixed ratio in the peripheral direction.

As mentioned above, in accordance with the stator cascade 1 in accordance with the present invention, since there are formed the wave fronts having the different moving directions and phases, and these wave fronts are interfered with each other so as to be attenuated, the interference noise is reduced.

Further, the attenuation due to the mutual interference of the wave fronts mentioned above is applied not only to the primary component of the generated sound wave but also to the secondary or higher order components in the same manner. Accordingly, even in the case of selecting such the conventional rotor stator blade number ratio as to cut off only the primary component, it is possible to reduce the noise caused by the secondary or higher order components.

Further, even in the case of selecting the rotor stator blade number ratio at which the primary component of the generated sound wave is not originally cut off, it is possible to reduce the interference noise on the basis of the mutual interference of the wave fronts mentioned above.

As mentioned above, since the interference noise is reduced, it is possible to reduce the used amount of the sound absorption plate. Further, it is possible to reduce the interference noise without enlarging the rotor stator blade interval.

Further, it is possible to contribute to the reduction of the fan noise constituting the main body of the engine noise, by applying the stator cascade 1 in accordance with the present invention to the fan of the jet engine.

Further, since the wave front having the different moving direction and phase from the other portion is formed at least partly as far as the stator blades are arranged in such a manner that the respective intervals between the adjacent stator blades become unequal at least partly (for example, at one position), the attenuation caused by the mutual interference of the wave fronts mentioned above are achieved by the interference of the wave fronts with each other. Accordingly, even in the case that the stator blades are arranged in such a manner that the respective intervals between the adjacent stator blades become unequal partly, it is possible to achieve the effect of reducing the interference noise.

A description will be given of several embodiments of the unequal interval layout of the stator blades in accordance with the present invention with reference to FIGS. 6 and 7.

Figure 6:
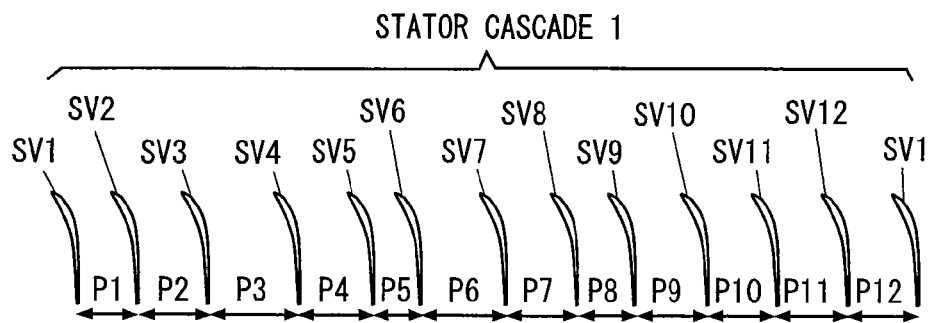
FIG. 6 is a view showing a state in which the stator cascade is constituted by twelve stator blades, and the stator blades are arranged at unequal intervals in a peripheral direction.

FIG. 6 is a view showing a state in which the stator cascade 1 is constituted by twelve stator blades SV1 to SV12, and the stator blades are arranged at unequal intervals in a peripheral direction. As shown in FIG. 6, the stator blade intervals are shown by reference symbols P1, P2, . . . P12.

Figure 7A:
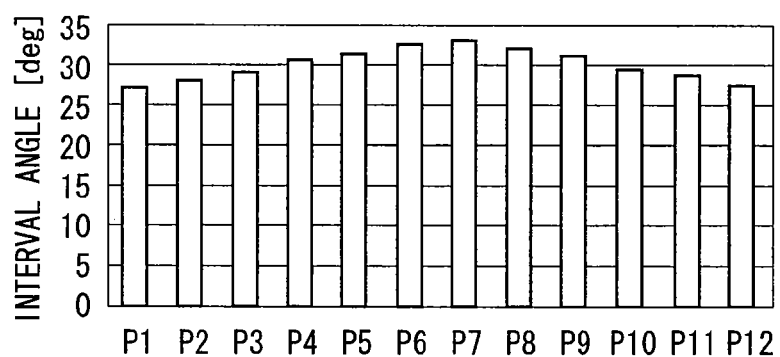
FIGS. 7A and 7B are views showing a distribution of the intervals of twelve stator blades shown in FIG. 6.
Figure 7B:
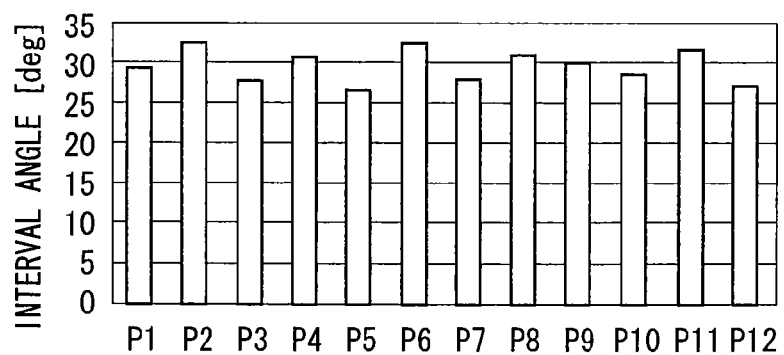

Each of FIGS. 7A and 7B is a view showing an interval distribution of twelve stator blades SV1 to SV12 shown in FIG. 6, in which a horizontal axis indicates an interval number, and a vertical axis indicates an interval angle [deg].

In the case that the stator cascade is constituted by twelve stator blades such as the conventional structure, the interval between the stator blades is set to 30 degree, however, in the stator cascade 1 in accordance with the present invention, the stator blade intervals become unequal within a range of several degrees around 30 degree.

In this case, the number of the stator blades constituting the stator cascade 1 is not limited to the number mentioned above.

In the embodiment in FIG. 7A, the intervals P1 to P12 are continuously increased toward the peripheral direction, and thereafter continuously decreased. In other words, peaks and troughs appear every one time during one circle.

In the embodiment in FIG. 7B, there is obtained a distribution that the intervals P1 to P12 are irregularly increased and decreased repeatedly toward the peripheral direction, as is different from the embodiment in FIG. 7A.

Further, in both of the embodiments in FIGS. 7A and 7B, the stator blades are arranged in such a manner that the intervals between the stator blades become all unequal.

As mentioned above, if the stator blades are arranged in such a manner that the intervals between the adjacent stator blades become all unequal, the wave fronts formed by the sound waves generated from the adjacent stator blades are all different in the moving direction and the phase.

Accordingly, it is possible to make the effect of attenuating on the basis of the mutual interference high, and it is possible to effectively reduce the interference noise.

Further, if the stator blades are arranged in such a manner that the intervals between the adjacent stator blades are irregularly increased and decreased repeatedly per the interval, such as the embodiment in FIG. 7B, the degree of disorder is increased in the moving direction and the phase of the respective wave fronts formed by the sound waves generated from the adjacent stator blades.

Accordingly, it is possible to make the effect of attenuating on the basis of the mutual interference higher, and it is possible to make the effect of reducing the interference noise higher.

EMBODIMENT

Figure 8:
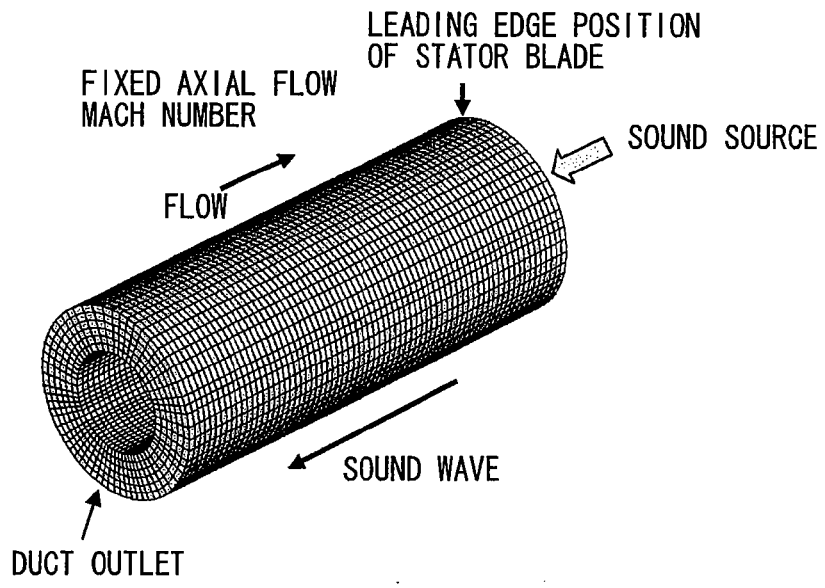
FIG. 8 is a view showing a double cylindrical duct formed by simulating a fan duct used in an analysis of the embodiment in accordance with the present invention.
Figure 9:
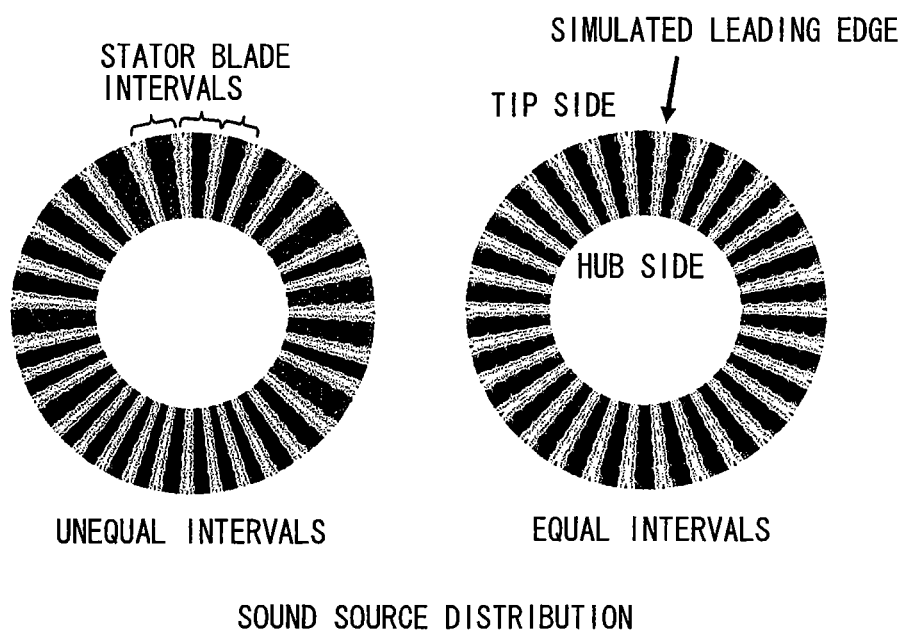
FIG. 9 is a view showing a sound soured distribution formed by simulating the stator blades serving as a sound source in the analysis of the embodiment in accordance with the embodiment of the present invention.

With regard to the stator cascade of the turbo type fluid machine in accordance with the present invention, there is executed an analysis for comprehending the effect. In this analysis, one end of a double cylinder duct formed by simulating a fan duct is set as a leading edge position of the stator blade, as shown in FIG. 8, a sound source distribution formed by simulating thirty stator blades serving as the sound source as shown in FIG. 9 is applied to the leading edge position of the stator blade, and there is searched how many modes the mode distributions in the other end of the duct are dispersed. In this case, a flow having a fixed axial flow Mach number is applied to an inverse direction to the moving direction of the sound wave within the duct.

In this analysis, in accordance that the mode distributions in the other end of the duct are divided into a lot of modes, and the magnitude thereof is smaller in comparison with the sound source applied to one end side, the sound waves in the respective modes are overlapped, and it is possible to expect an enlargement of the weakening effect, that is, an enlargement of the noise reducing effect.

The executed analysis is constituted by the following CASE 1 to 5.

CASE 1 is structured such that the intervals between the respective stator blades are equal, and is set to a comparative embodiment.

CASE 2 to 5 are structured such that all or a part of the intervals between the respective stator blades are unequal (the present invention). In CASE 2 to 5, a layout (a position in a peripheral direction: θ [deg]) of the respective stator blades simulated by the sound source distribution is as shown in Table 1 as follows.

Table 1

TABLE 1

| | CASE2 | CASE3 | CASE4 | CASE5 |
|---|---|---|---|---|
| 1 | 0 | 0 | 0 | 0 |
| 2 | 15.33 | 15.56 | 15.73 | 11.39 |
| 3 | 25.16 | 25.74 | 24.70 | 22.58 |
| 4 | 42.14 | 43.04 | 41.74 | 34.14 |
| 5 | 55.20 | 55.85 | 54.09 | 45.49 |
| 6 | 69.18 | 70.22 | 68.03 | 56.36 |
| 7 | 80.97 | 81.54 | 79.51 | 69.23 |
| 8 | 92.84 | 93.37 | 91.58 | 80.89 |
| 9 | 108.93 | 109.68 | 107.32 | 91.76 |
| 10 | 126.54 | 126.97 | 124.36 | 104.87 |
| 11 | 138.84 | 139.23 | 136.72 | 118.10 |
| 12 | 151.40 | 152.05 | 150.65 | 131.18 |
| 13 | 163.56 | 164.22 | 162.72 | 144.71 |
| 14 | 175.31 | 176.05 | 174.21 | 156.78 |
| 15 | 191.10 | 191.61 | 189.94 | 170.78 |
| 16 | 200.83 | 201.35 | 199.56 | 182.95 |
| 17 | 209.51 | 210.05 | 208.32 | 195.57 |
| 18 | 221.70 | 222.23 | 220.40 | 208.65 |
| 19 | 230.43 | 230.93 | 229.16 | 219.85 |
| 20 | 293.45 | 239.91 | 238.12 | 232.40 |
| 21 | 249.14 | 249.48 | 247.74 | 245.30 |
| 22 | 258.02 | 258.38 | 256.50 | 256.43 |
| 23 | 268.55 | 268.56 | 266.53 | 267.51 |
| 24 | 277.98 | 278.12 | 276.16 | 279.17 |
| 25 | 286.93 | 287.10 | 286.19 | 290.34 |
| 26 | 295.86 | 296.01 | 295.15 | 302.62 |
| 27 | 306.76 | 307.33 | 306.63 | 314.35 |
| 28 | 318.98 | 319.59 | 318.99 | 325.87 |
| 29 | 335.51 | 335.90 | 336.03 | 337.74 |
| 30 | 345.51 | 345.63 | 346.07 | 349.27 |

More detailed layout conditions of CASE 2 is as follows.

All of the stator blade intervals are differentiated. In other words, a kind of the stator blade interval is set to thirty.

The respective stator blade intervals are changed so as to be increased at 47% to the maximum and be decreased at 28% to the minimum with respect to the stator blade interval (the case of CASE 1) in the case that all the stator blades are arranged at the equal intervals.

A value obtained by dividing a standard deviation of the dispersion in the peripheral direction of the respective intervals between the adjacent stator blades by an average stator blade interval (an average pitch interval) is 0.226, and a value obtained by dividing a standard deviation of a dispersion in the peripheral direction of respective interval differences between the adjacent stator blades by the average stator blade interval is 0.277.

More detailed layout conditions of CASE 3 is as follows.

The stator blade intervals are made equal every two intervals. In other words, a kind of the stator blade interval is set to fifteen.

The respective stator blade intervals are changed so as to be increased at 47% to the maximum and be decreased at 28% to the minimum with respect to the stator blade interval in the case that all the stator blades are arranged at the equal intervals. Further, the value obtained by dividing the standard deviation of the dispersion in the peripheral direction of the respective intervals between the adjacent stator blades by the average stator blade interval is 0.226, and a value obtained by dividing a standard deviation of a dispersion in the peripheral direction of respective interval differences between the adjacent stator blades by the average stator blade interval is 0.274.

More detailed layout conditions of CASE 4 is as follows.

The stator blade intervals are made equal every three intervals. In other words, a kind of the stator blade interval is set to ten.

The respective stator blade intervals are changed so as to be increased at 47% to the maximum and be decreased at 28% to the minimum with respect to the stator blade interval in the case that all the stator blades are arranged at the equal intervals. Further, the value obtained by dividing the standard deviation of the dispersion in the peripheral direction of the respective intervals between the adjacent stator blades by the average stator blade interval is 0.225, and a value obtained by dividing a standard deviation of a dispersion in the peripheral direction of respective interval differences between the adjacent stator blades by the average stator blade interval is 0.290.

More detailed layout conditions of CASE 5 is as follows.

The stator blade intervals are all differentiated. In other words, a kind of the stator blade interval is set to thirty.

The respective stator blade intervals are changed so as to be increased at 13% to the maximum and be decreased at 11% to the minimum with respect to the stator blade interval in the case that all the stator blades are arranged at the equal intervals. Further, the value obtained by dividing the standard deviation of the dispersion in the peripheral direction of the respective intervals between the adjacent stator blades by the average stator blade interval is 0.071, and a value obtained by dividing a standard deviation of a dispersion in the peripheral direction of respective interval differences between the adjacent stator blades by the average stator blade interval is 0.081.

FIGS. 10A to 10E show results of analysis of CASE 1 to 5.

Figure 10A:
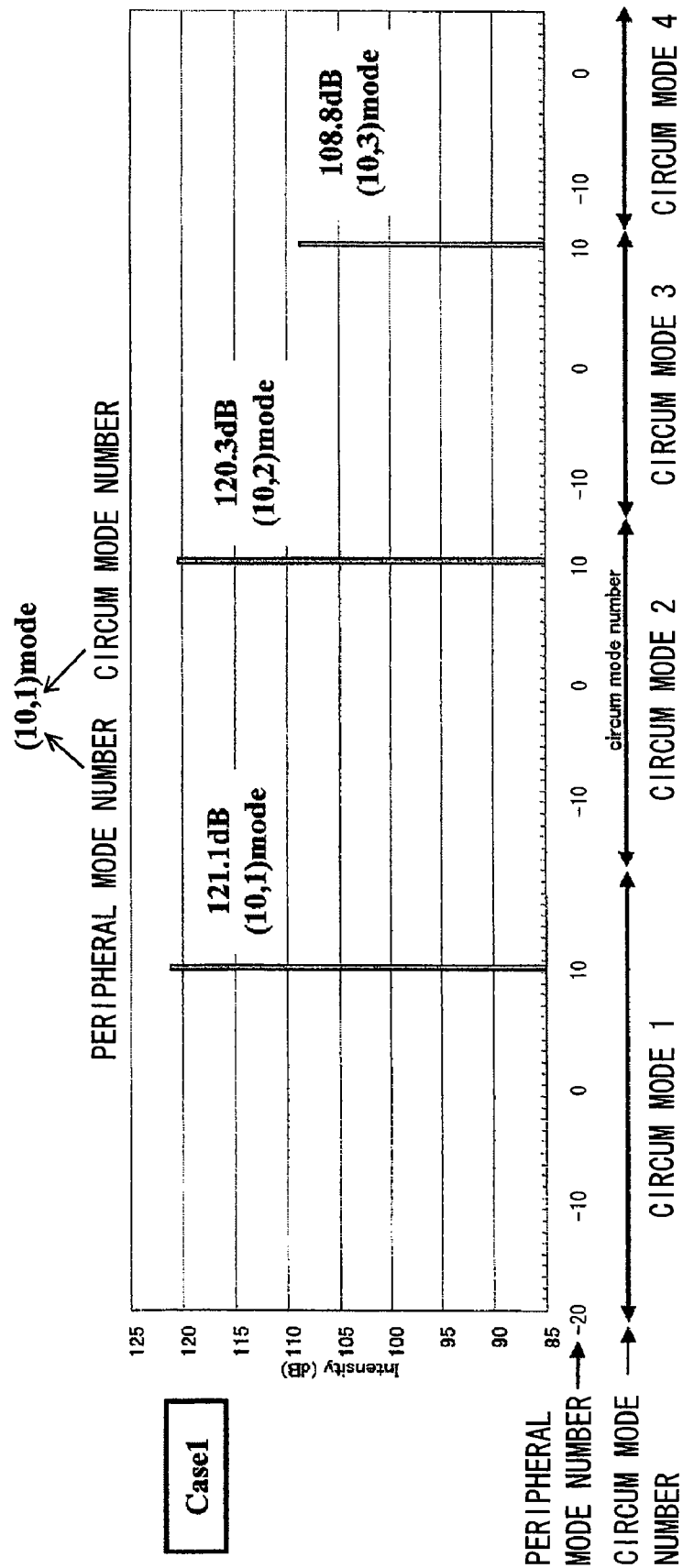
FIG. 10A shows a result of analysis of a comparative embodiment.

From FIG. 10B, in the case of CASE 2, it is known that the maximum value is decreased at about 5 dB in comparison with CASE 1 shown in FIG. 10A (decreased to 115.7 dB from 121.1 dB). Further, while a specific mode is distinguished in CASE 1 in which the stator blade intervals are equal, the modes are dispersed to a lot of modes and the level is low in CASE 2 in which the stator blade intervals are unequal. Accordingly, it is known that it is possible to obtain a high noise reduction effect in CASE 2.

Figure 10C:
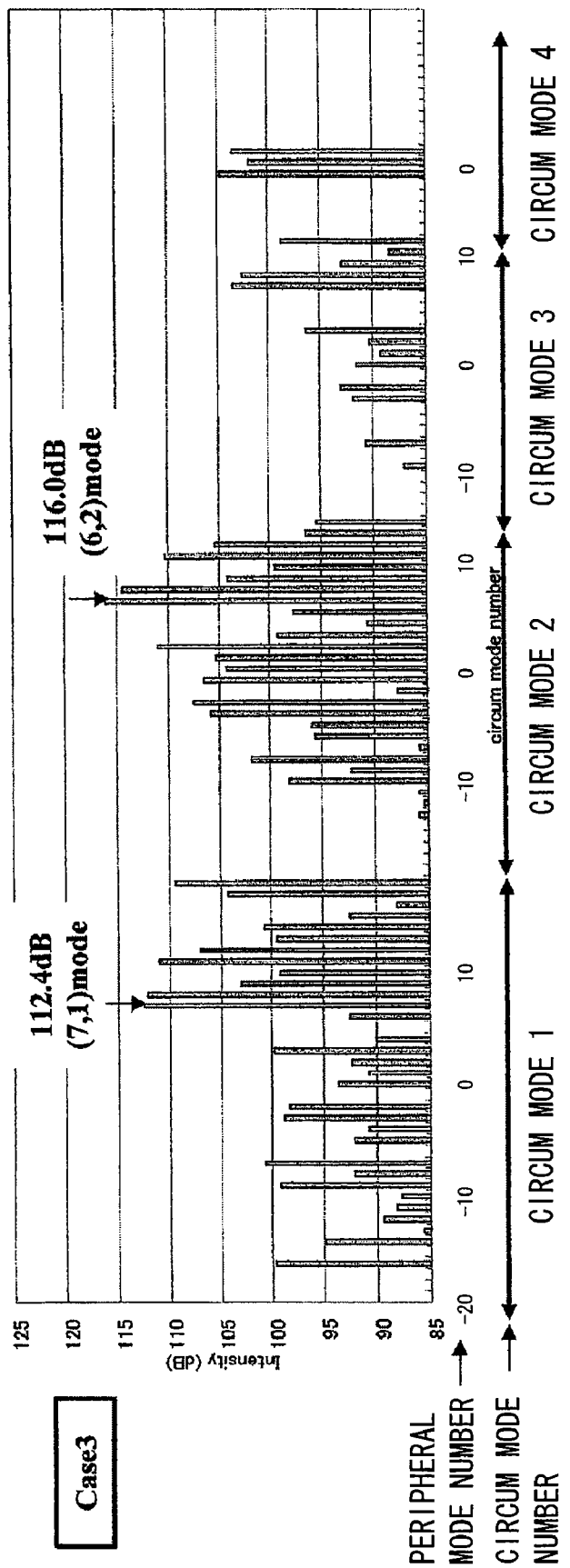
Figure 10D:
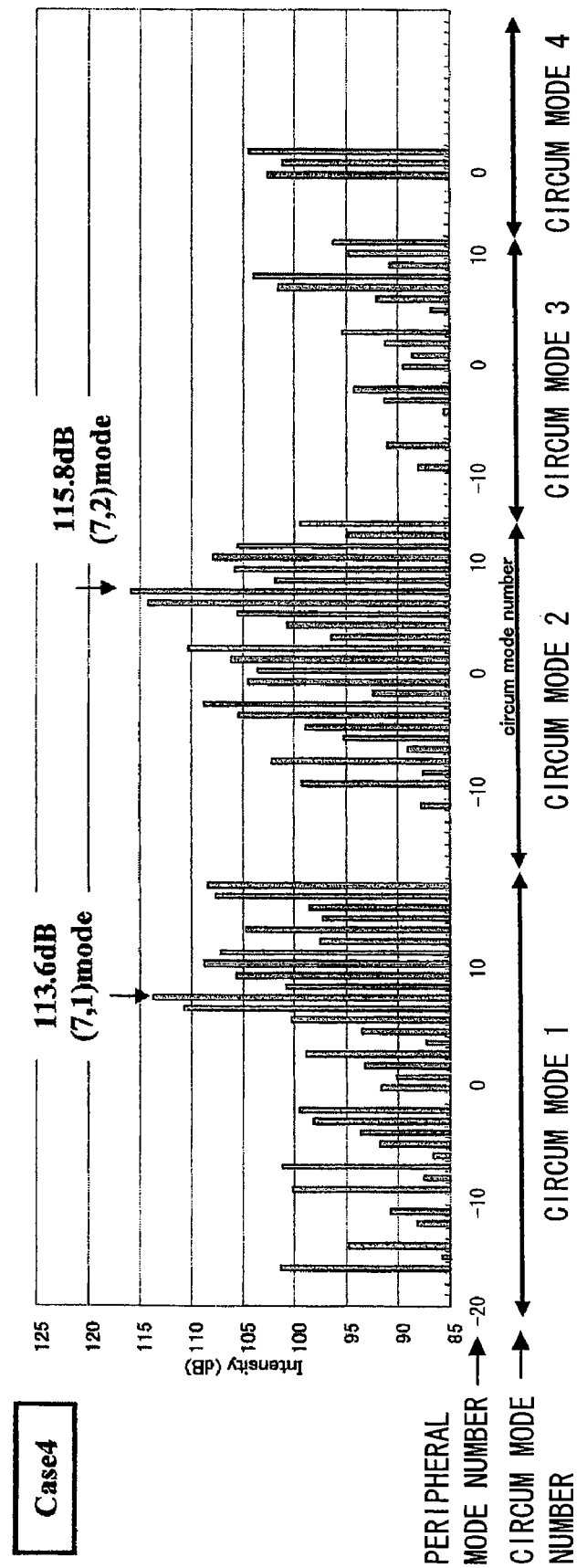

Further, from FIGS. 10C and 10D, it is known that it is possible to obtain a high noise reduction effect having the same level as CASE 2 in which all the stator blade intervals are differentiated, even in the case of CASE 3 and CASE 4 in which the kind number of the stator blade intervals is reduced in comparison with CASE 2. In other words, in CASE 3 and CASE 4, since the value obtained by dividing the standard deviation of the dispersion in the peripheral direction of the respective intervals between the adjacent stator blades by the average stator blade interval, and the value obtained by dividing the standard deviation of the dispersion in the peripheral direction of the respective interval differences between the adjacent stator blades come to the value equal to or more than the values in CASE 2, it is possible to obtain the high noise reduction effect at the same level as CASE 1.

Further, from FIG. 10E, it is known that the respective peripheral modes are distributed around a portion near a peripheral mode 10 of CASE 1 (in the case of the stator blades having the equal intervals) in CASE 5, and the distributing range to the other peripheral mode components is reduced in comparison with the case of CASE 2. This indicates that the noise reduction effect becomes lower by making the degree of unequal small.

Taking the results mentioned above into consideration, it is preferable that the layout of the stator blades in the present invention satisfies the following condition on the presupposition that the respective intervals between the adjacent stator blades are all unequal or unequal at least partly.

(1) At least partial interval of the respective intervals between the adjacent stator blades can be increased at least 5% or more or decreased at least 5% or more, with respect to the stator blade interval in the case that all the stator blades are arranged at the uniform intervals.

(2) It is preferable that at least partial interval of the respective intervals between the adjacent stator blades is increased at least 10% or more or decreased at least 10% or more, with respect to the stator blade interval in the case that all the stator blades are arranged at the uniform intervals.

(3) It is preferable that at least partial interval of the respective intervals between the adjacent stator blades is increased at least 20% or more or decreased at least 20% or more, with respect to the stator blade interval in the case that all the stator blades are arranged at the uniform intervals.

(4) It is preferable that the value obtained by dividing the standard deviation of the dispersion in the peripheral direction of the respective intervals between the adjacent stator blades by the average stator blade interval is equal to or more than 0.03.

(5) It is preferable that the value obtained by dividing the standard deviation of the dispersion in the peripheral direction of the respective intervals between the adjacent stator blades by the average stator blade interval is equal to or more than 0.1.

(6) It is preferable that the value obtained by dividing the standard deviation of the dispersion in the peripheral direction of the respective interval differences between the adjacent stator blades by the average stator blade interval is equal to or more than 0.03.

(7) It is preferable that the value obtained by dividing the standard deviation of the dispersion in the peripheral direction of the respective interval differences between the adjacent stator blades by the average stator blade interval is equal to or more than 0.1.

(8) It is more preferable to combine the conditions (1) to (3) mentioned above, with the conditions (4) to (7) mentioned above.

As described above, in accordance with the present invention, there can be obtained an excellent effect that it is possible to reduce the interference noise without enlarging the rotor stator blade interval, as well as it is possible to reduce the used amount of the sound absorption material.

In this case, in the embodiment mentioned above, the present invention is described by targeting the stator cascade in the jet engine, however, the applied range of the present invention is not limited to this, but the present invention can be applied to all the turbo type fluid machines having the stator cascade. Accordingly, the present invention can be applied, for example, to the stator cascade of the centrifugal compressor.

In addition, it goes without saying that the present invention is not limited to the embodiments mentioned above, but can be variously modified within the scope of the present invention.

The invention claimed is:

1. A stator cascade of a turbo type fluid machine, wherein the stator cascade is arranged on a downstream side of a rotor cascade in the turbo type fluid machine, wherein the stator cascade comprises:
a plurality of stator blades that are arranged at first intervals in a peripheral direction, wherein the plurality of stator blades are arranged in a manner so that the respective first intervals between the adjacent stator blades are at least partly unequal, and wherein at least a part of second intervals of the first intervals between adjacent stator blades is increased at least 20% or more, or is decreased at least 20% or more, with respect to the first interval between adjacent stator blades so that not all of the plurality of stator blades are arranged at an equal first interval.

2. A stator cascade of a turbo type fluid machine as claimed in claim 1, wherein the respective first intervals between adjacent stator blades are repeatedly increased and decreased irregularly per adjacent first intervals.

3. A stator cascade of a turbo type fluid machine as claimed in claim 1, wherein a value obtained by dividing a standard deviation of a dispersion in the peripheral direction of the first intervals between the adjacent stator blades by an average stator blade interval is equal to or more than 0.03.

4. A stator cascade of a turbo type fluid machine as claimed in claim 1, wherein a value obtained by dividing a standard deviation of a dispersion in the peripheral direction of the first intervals between the adjacent stator blades by an average stator blade interval is equal to or more than 0.1.

5. A stator cascade of a turbo type fluid machine as claimed in claim 1, wherein a value obtained by dividing a standard deviation of a dispersion in the peripheral direction of interval differences between the adjacent stator blades by an average stator blade interval is equal to or more than 0.03.

6. A stator cascade of a turbo type fluid machine as claimed in claim 1, wherein a value obtained by dividing a standard deviation of a dispersion in the peripheral direction of interval differences between the adjacent stator blades by an average stator blade interval is equal to or more than 0.1.

7. A stator cascade of a turbo type fluid machine as claimed in claim 1, wherein the turbo type fluid machine is a fan of a jet engine, and each stator blade is a stator blade of the fan.

8. A stator cascade arranged on a downstream side of a rotor cascade in a turbo type fluid machine, wherein the stator cascade comprises a plurality of stator blades arranged at first intervals in a peripheral direction, wherein the plurality of stator blades are arranged in a manner so that respective first intervals between adjacent stator blades are all unequal, and wherein at least a part of second intervals of the first intervals between adjacent stator blades is increased at least 20% or more, or is decreased at least 20% or more, with respect to the first interval between adjacent stator blades so that not all of the stator blades are arranged at an equal first interval.

9. A stator cascade as claimed in claim 8, wherein the respective first intervals between the adjacent stator blades are repeatedly increased and decreased irregularly per adjacent first intervals.

10. A stator cascade as claimed in claim 8, wherein a value obtained by dividing a standard deviation of a dispersion in the peripheral direction of the first intervals between the adjacent stator blades by an average stator blade interval is equal to or more than 0.03.

11. A stator cascade as claimed in claim 8, wherein a value obtained by dividing a standard deviation of a dispersion in the peripheral direction of the first intervals between the adjacent stator blades by an average stator blade interval is equal to or more than 0.1.

12. A stator cascade as claimed in claim 8, wherein a value obtained by dividing a standard deviation of a dispersion in the peripheral direction of interval differences between the adjacent stator blades by an average stator blade interval is equal to or more than 0.03.

13. A stator cascade as claimed in claim 8, wherein a value obtained by dividing a standard deviation of a dispersion in the peripheral direction of interval differences between the adjacent stator blades by an average stator blade interval is equal to or more than 0.1.

14. A stator cascade as claimed in claim 8, wherein the turbo type fluid machine is a fan of a jet engine, and each stator blade is a stator blade of the fan.

* * * * *